(12) United States Patent
Tozuka et al.

(10) Patent No.: US 7,332,684 B2
(45) Date of Patent: Feb. 19, 2008

(54) TURN SIGNAL SWITCH FOR VEHICLE

(75) Inventors: Tsutomu Tozuka, Saitama (JP); Takashi Nakamura, Saitama (JP)

(73) Assignee: Toyo Denso Co., Ltd., Tokyo (JP)

( * ) Notice: Subject to any disclaimer, the term of this patent is extended or adjusted under 35 U.S.C. 154(b) by 0 days.

(21) Appl. No.: 11/700,134

(22) Filed: Jan. 31, 2007

(65) Prior Publication Data
US 2007/0278072 A1    Dec. 6, 2007

(30) Foreign Application Priority Data
Jun. 2, 2006    (JP) .............................. 2006-155057

(51) Int. Cl.
*H01H 3/16* (2006.01)
(52) U.S. Cl. .............................. 200/61.27; 200/61.85; 200/332.2
(58) Field of Classification Search .................... 200/4, 200/5 R, 18, 336, 329, 61.27, 61.85, 332.2
See application file for complete search history.

(56) References Cited

U.S. PATENT DOCUMENTS 3,805,003 A * 4/1974 Rennels ................... 200/332.2
4,710,599 A * 12/1987 Motodate et al. ......... 200/61.85
5,708,243 A * 1/1998 Karasik et al. .......... 200/61.54
6,278,070 B1 * 8/2001 Neubauer et al. ........ 200/61.27
6,694,236 B2 * 2/2004 Onodera ...................... 701/36

FOREIGN PATENT DOCUMENTS

JP    2-36194 Y2    10/1990

* cited by examiner

*Primary Examiner*—K. Richard Lee
(74) *Attorney, Agent, or Firm*—Arent Fox LLP (57) ABSTRACT

A turn signal switch for a vehicle includes: a resiliently urging means provided between a switch operating element and a switch case so as to urge the switch operating element toward a neutral position and a returned position. The resiliently urging means includes: a return plate having a guide recess which is provided at one end and against which abuts a first pin provided on the switch operating element, the return plate being slidably supported on the switch case; a pair of return springs exhibiting spring forces for urging the return plate in a direction to bring the pin into abutment against the guide recess. The guide recess is curved into a substantially triangular shape, and includes a valley and return cam faces on opposite sides of the valley. The return springs are provided on opposite sides of the valley and between the return plate and the switch case. Thus, it is possible to reduce the length of the turn signal switch in the direction of push-in/return of the switch operating element.

4 Claims, 12 Drawing Sheets

FIG.5 (NEUTRAL STATE)

FIG.6 (NEUTRAL STATE)

FIG.7

(NEUTRAL STATE)

FIG.8

FIG.9
(LEFT-TURN INDICATING STATE)

TURN SIGNAL SWITCH FOR VEHICLE

RELATED APPLICATION DATA

The present invention is based upon Japanese priority application No. 2006-155057, which is hereby incorporated in its entirety herein by reference.

BACKGROUND OF THE INVENTION

1. Field of the Invention

The present invention relates to a turn signal switch for a vehicle, and particularly to a turn signal switch for a vehicle, comprising: a switch case; a pivot provided in the switch case; a switch operating element whose portion protrudes into the switch case, and which is supported by the pivot so that the switch operating element can be pushed-in and returned between a pushed-in position and a returned position which are spaced apart from each other in a direction perpendicular to an axis of the pivot, and so that, in the returned position, the switch operating element can be swung about the axis of the pivot among a neutral position, and a left-turn indicating position and a right-turn indicating position on opposite sides of the neutral position; a resiliently urging means provided between the switch case and the switch operating element so as to urge the switch operating element toward the neutral position and the returned position; and a switch mechanism operatively connected to the switch operating element, and adapted to close a left-turn indicating circuit or a right-turn indicating circuit in response to swinging of the switch operating element to the left-turn or right-turn indicating position when the switch operating element is in the returned position, and adapted to open the left-turn or right-turn indicating circuit in response to movement of the switch operating element from the returned position to the pushed-in position.

2. Description of the Related Art

Such a turn signal switch for a vehicle is already known, for example, from Japanese Utility Model Publication No. 2-36194. In this turn signal switch, a substantially triangular guide recess comprising a valley and return cam faces on opposite sides of the valley is provided at an end of a switch operating element protruding into a switch case, a single return spring is provided between the switch case and a steel ball capable of abutting against the guide recess, and the switch operating element is urged toward a neutral position and a returned position by a resilient force exhibited by the return spring, thereby bringing the steel ball into abutment against and engagement with the valley.

However, in this conventional turn signal switch, the switch operating element and the return spring provided between the switch operating element and the switch case are connected to each other in series in the pushing-in/returning direction of the switch operating element, resulting in that the switch has a relatively large entire length in the pushing-in/returning direction.

SUMMARY OF THE INVENTION

Accordingly, it is an object of the present invention to provide a turn signal switch for a vehicle, wherein length of the switch can be reduced in the pushing-in/returning direction of a switch operating element.

In order to achieve the above object, according to a first feature of the present invention, there is provided a turn signal switch for a vehicle, comprising: a switch case; a pivot provided in the switch case; a switch operating element whose portion protrudes into the switch case, and which is supported by the pivot so that the switch operating element can be pushed-in and returned between a pushed-in position and a returned position which are spaced apart from each other in a direction perpendicular to an axis of the pivot, and so that, in the returned position, the switch operating element can be swung about the axis of the pivot among a neutral position, and a left-turn indicating position and a right-turn indicating position on opposite sides of the neutral position; a resiliently urging means provided between the switch case and the switch operating element so as to urge the switch operating element toward the neutral position and the returned position; and a switch mechanism operatively connected to the switch operating element, and adapted to close a left-turn indicating circuit or a right-turn indicating circuit in response to swinging of the switch operating element to the left-turn or right-turn indicating position when the switch operating element is in the returned position, and adapted to open the left-turn or right-turn indicating circuit in response to movement of the switch operating element from the returned position to the pushed-in position, wherein the resiliently urging means includes: a return plate having a guide recess which is provided at its one end and against which abuts a first pin provided on the switch operating element, the return plate being supported on the switch case so that the return plate can slide in a direction parallel to directions to push-in and return the switch operating element; and a pair of return springs provided between the return plate and the switch case to exhibit spring forces for urging the return plate in a direction to bring the pin into abutment against the guide recess, wherein the guide recess is curved into a substantially triangular shape, and includes: a valley against which the pin is brought into abutment in a state in which the switch operating element is in the neutral position; and return cam faces provided on opposite sides of the valley, and inclined so that the pin is brought into abutment against the return cam faces in response to the swinging of the switch operating element to the left-turn and right-turn indicating positions, and wherein the return springs are provided between the return plate and the switch case on the opposite sides of the valley.

With the first feature of the present invention, the pair of return springs provided between the return plate and the switch case exhibit the spring forces as follows: when the switch operating element is in the neutral position, the pin is urged to abut against the valley; when the switch operating element is swung to the left-turn or right-turn indicating position, the pin abutting against one of the return cam faces on the opposite sides of the valley is urged to return to the valley, i.e., the switch operating element is urged to return to the neutral position; and when the switch operating element is pushed to the pushed-in position, the first pin 47 is urged to return to the returned position. Further, the return plate and the pair of return springs are disposed in parallel on the switch operating element, thereby reducing the entire length of the switch in the pushing-in/returning direction of the switch operating element. Furthermore, the pair of return springs exhibit the spring forces from the opposite sides to return the switch operating element to the neutral position, thereby suppressing the wobbling of the switch operating element during operation thereof to improve the operational feeling.

According to a second feature of the present invention, in addition to the first feature, the switch mechanism includes a stationary contact base having a plurality of stationary contacts and fixedly disposed within the switch case, and a movable contact holder having a plurality of movable contacts and disposed to face the stationary contact base so that states of conduction contact of the movable contacts with the plurality of stationary contacts are changed in response to the swinging of the switch operating element; and the movable contact holder is integrally provided with a cover portion so as to cover from above a region between opposed surfaces of the movable contact holder and the stationary contact base when at least both the left-turn and right-turn indicating circuits are opened.

With the second feature of the present invention, when at least both the left-turn and right-turn indicating circuits are in the open states, the region between the opposed surfaces of the movable contact holder and the stationary contact base is covered from above with the cover portion integrally provided on the movable contact holder. That is, the region between the opposed surfaces of the movable contact holder and the stationary contact base is covered from above when both the left-turn and right-turn indicating circuits are in the open states, i.e., in a state in which at least neither left-turn nor right-turn indicating operation is carried out, thereby preventing rainwater or the like from entering the region between the opposed surfaces of the movable contact holder and the stationary contact base from above.

According to a third feature of the present invention, there is provided a turn signal switch for a vehicle, comprising: a switch case; a pivot provided in the switch case; a switch operating element whose portion protrudes into the switch case, and which is supported by the pivot so that the switch operating element can be pushed-in and returned between a pushed-in position and a returned position which are spaced apart from each other in a direction perpendicular to an axis of the pivot, and so that, in the returned position, the switch operating element can be swung about the axis of the pivot among a neutral position, and a left-turn indicating position and a right-turn indicating position on opposite sides of the neutral position; a resiliently urging means provided between the switch case and the switch operating element so as to urge the switch operating element toward the neutral position and the returned position; and a switch mechanism operatively connected to the switch operating element, and adapted to close a left-turn indicating circuit or a right-turn indicating circuit in response to swinging of the switch operating element to the left-turn or right-turn indicating position when the switch operating element is in the returned position, and adapted to open the left-turn or right-turn indicating circuit in response to movement of the switch operating element from the returned position to the pushed-in position, wherein the resiliently urging means and the switch mechanism are disposed within the switch case with the switching operating element interposed therebetween.

With the third feature of the present invention, the resiliently urging means and the switch mechanism are disposed on the opposite sides of the switch operating element, thereby reducing the entire length of the turn signal switch in the pushing-in/returning direction of the switch operating element. Further, the position of the switch operating element can be changed depending on which side of the switch operating element the resiliently urging means and the switch mechanism are disposed on, thereby increasing the degree of freedom in arranging an operating portion of the switch operating element.

According to a fourth feature of the present invention, in addition to the third feature, the switch operating element includes a first pin protruding out of one surface of the switch operating element, and a second pin protruding out of the other surface of the switch operating element at a position more spaced apart from the pivot as compared with the first pin; the resiliently urging means is disposed on one side of the switch operating element so as to apply to the first pin a resiliently urging force for urging the first pin toward the neutral position and the returned position; and a movable contact holder constituting a portion of the switch mechanism and having a plurality of movable contacts is operatively connected to the second pin so that the movable contact holder slides among the neutral position and the left-turn and right-turn indicating positions on the opposite sides of the neutral position, in response to the swinging of the switch operating element.

With the fourth feature of the present invention, the distance between the second pin operatively connected to the movable contact holder of the switch mechanism and the pivot is relatively increased to relatively increase the amount of sliding of the movable contact holder with the swinging of the switch operating element, thereby securing a sufficient insulation distance between the contacts of the switch mechanism. Further, a space required for movement of the resiliently urging means in the pushing-in/returning direction is reduced by the arrangement wherein the resiliently urging force of the resiliently urging means is applied to the first pin having a relatively large distance from the pivot, thereby downsizing the turn signal switch and increasing the degree of freedom in setting an operating load.

The above and other objects, features and advantages of the invention will become apparent from the following description of the preferred embodiment taken in conjunction with the accompanying drawings.

DETAILED DESCRIPTION OF THE PREFERRED EMBODIMENT

Figure 1:
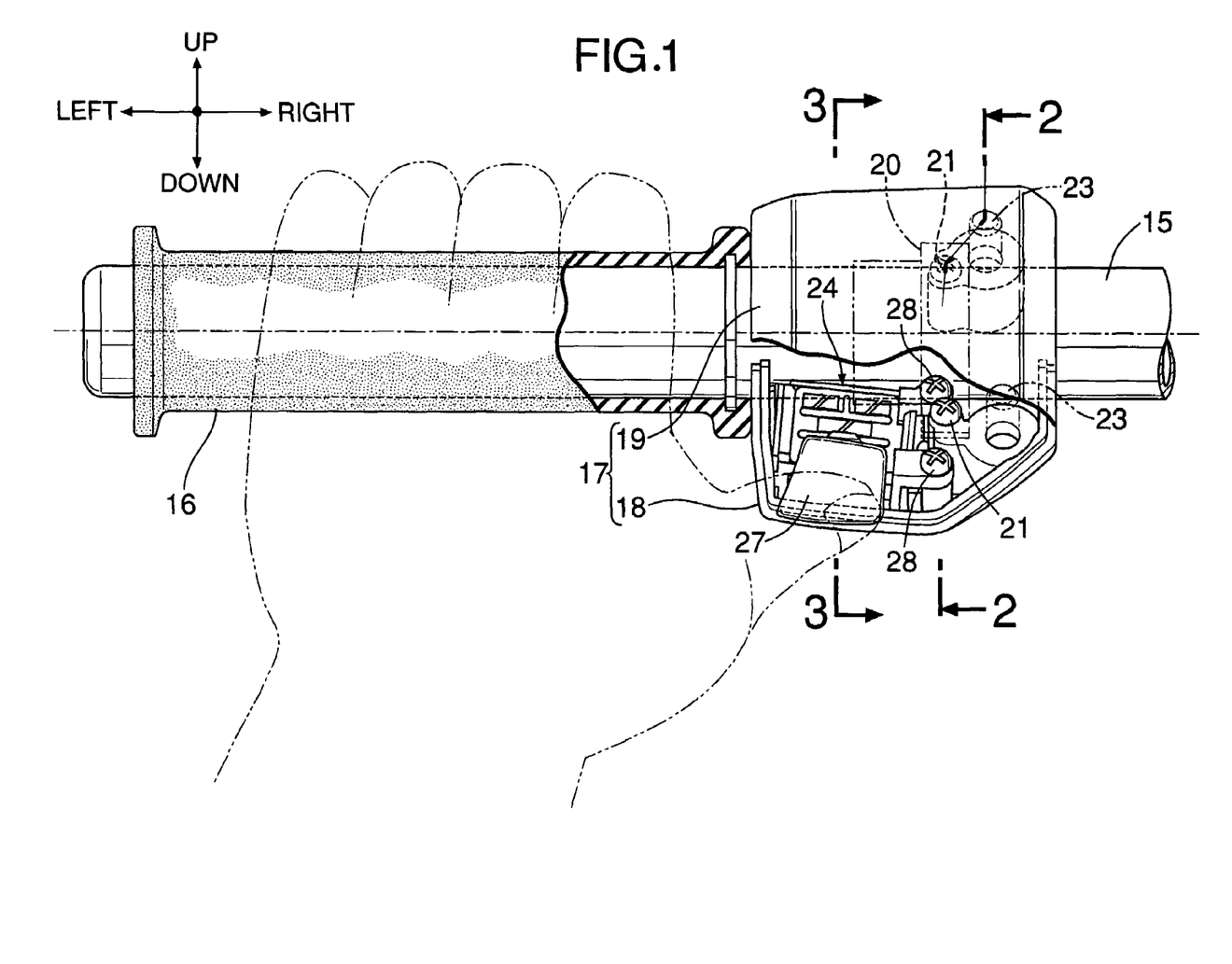
FIG. 1 is a partially cutaway front view of a portion of a steering handlebar of a motorcycle as viewed from behind, including a turn signal switch for a vehicle according to an embodiment of the present invention.

Referring first to FIG. 1, a grip 16 adapted to be grabbed by a rider's left hand is mounted at a left end of a steering handlebar 15, for example, for a motorcycle. A synthetic resin switch cover 17 is mounted to the steering handlebar 15 at a position inward of and adjacent to the grip 16.

Figure 2:
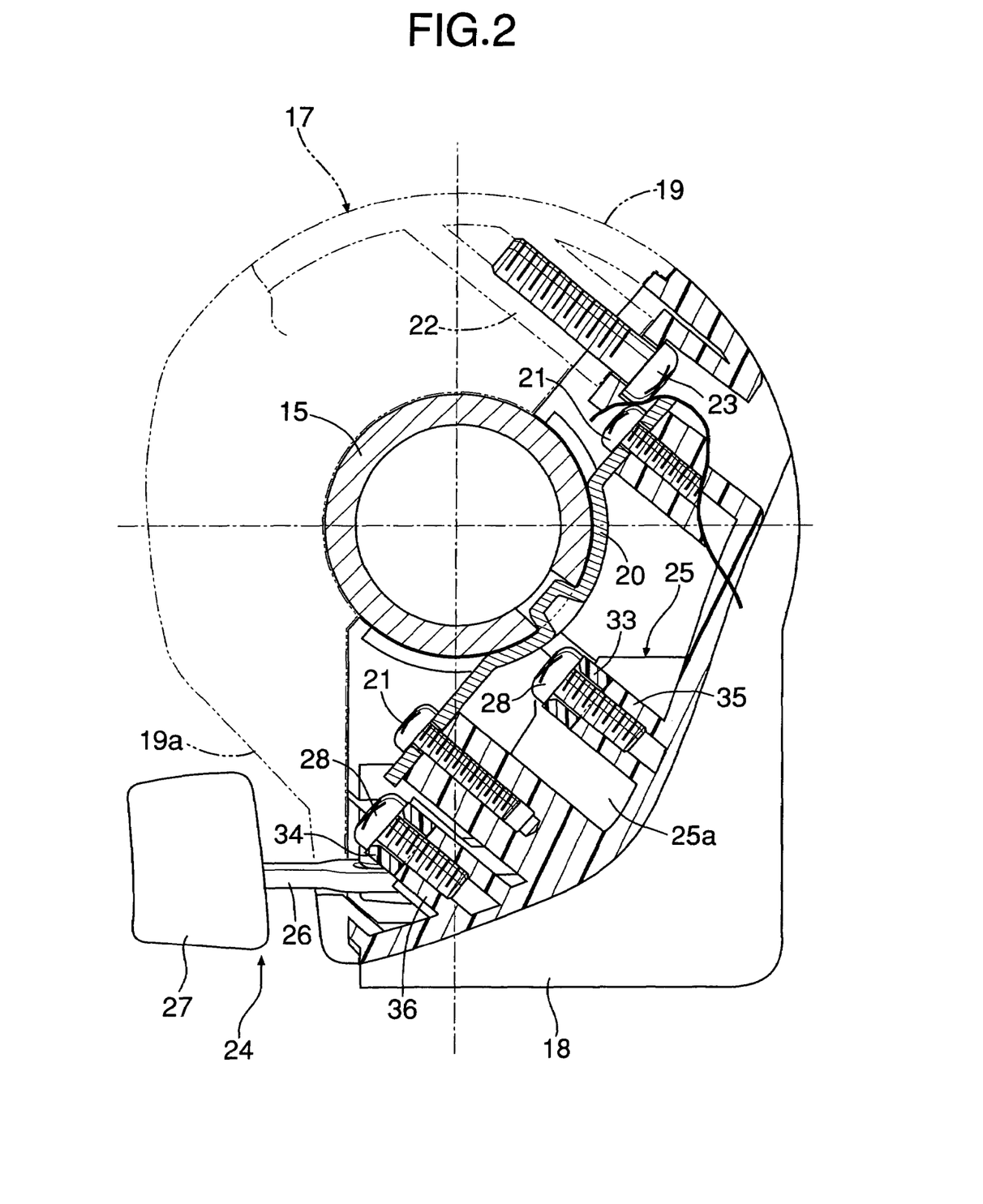
FIG. 2 is an enlarged sectional view taken along a line 2-2 in FIG. 1.
Figure 3:
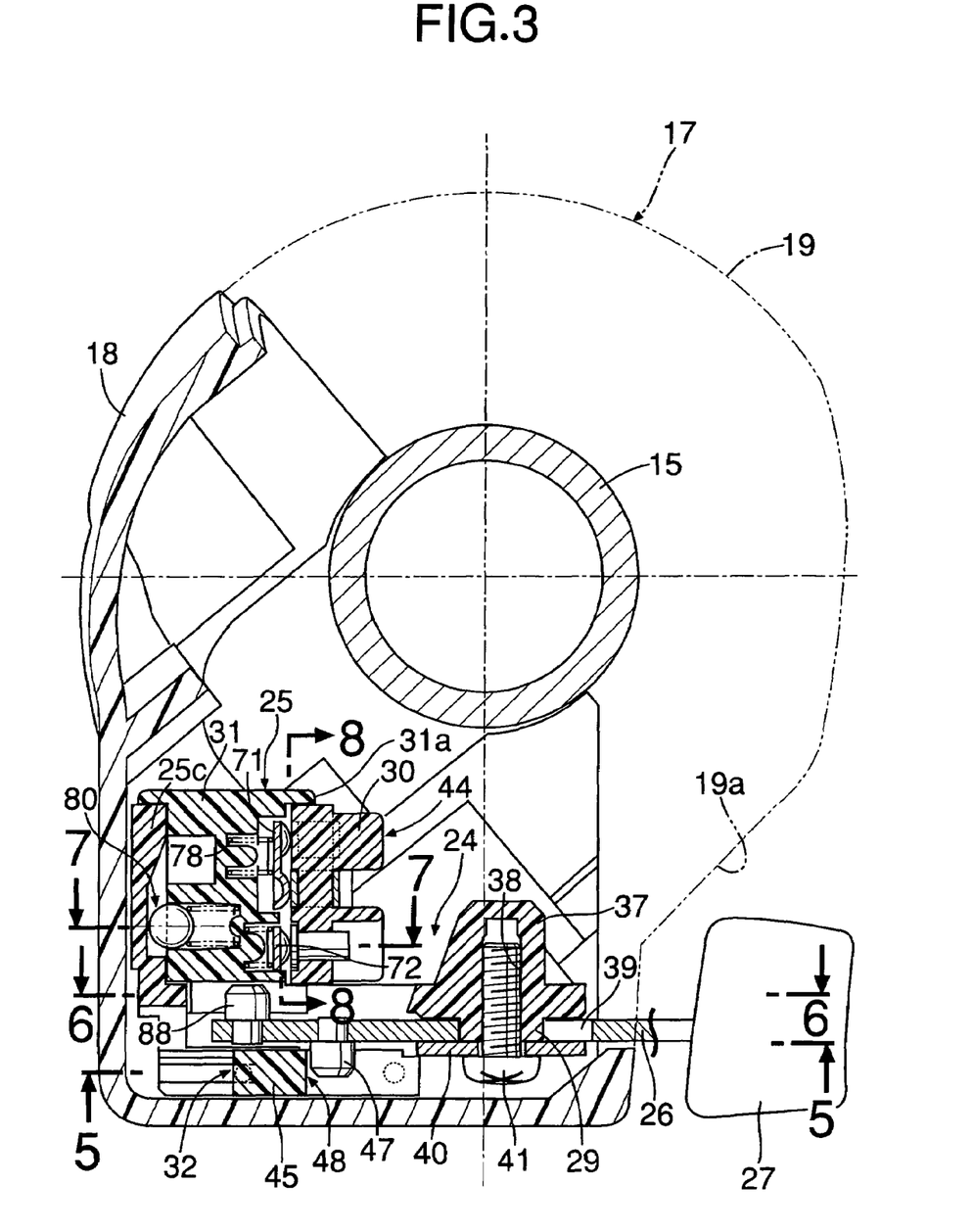
FIG. 3 is an enlarged sectional view taken along a line 3-3 in FIG. 1 in a state in which a switch operating element is in a neutral position.
Figure 4:
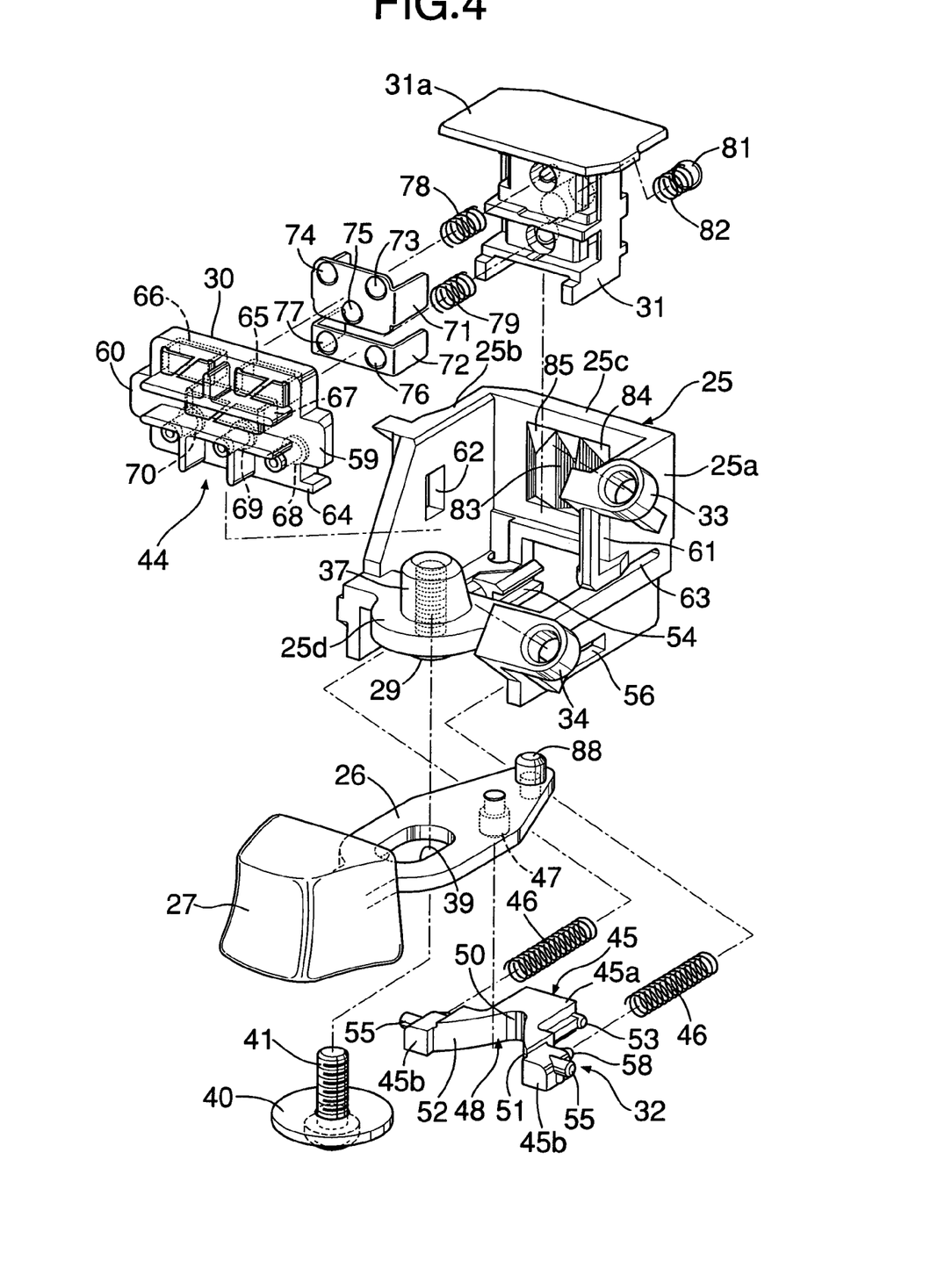
FIG. 4 is an exploded perspective view of a turn signal switch.

Referring also to FIGS. 2 and 3, the switch cover 17 comprises: a first cover half 18 which covers the steering handlebar 15 from obliquely below on a front side; and a second cover half 19 which covers the steering handlebar 15 from obliquely above on a rear side, the cover halves 18 and 19 being coupled to each other. The switch cover 17 is formed into a substantially cylindrical shape having end walls at its opposite ends, through which the steering handlebar 15 passes. A metal mounting member 20 is attached to the first cover half 18 by a plurality of, e.g., a pair of screw members 21, 21 so that the metal mounting member 20 abuts against and is positioned around an outer periphery of a substantially half portion of the first cover half 18. A plurality of, e.g., a pair of mounting legs 22 are provided on the second cover half 19 to abut against the first cover half 18. The screw members 23, 23 are inserted through the first cover half 18, threaded into the mounting legs 22 and tightened, whereby the first and second cover halves 18 and 19 are secured to each other to constitute the switch over 17 which is attached to the steering handlebar 15.

A switch case 25 of a turn signal switch 24 is housed and fixed within the switch cover 17. A switch operating element 26 of the turn signal switch 24 is mounted at a rear and lower portion of the second cover half 19 to protrude rearwards from a recess 19a depressed forwards. A knob 27 is mounted at a protruding end of the switch operating element 26.

Referring to FIGS. 4 to 8, the turn signal switch 24 includes: the switch case 25 made of a synthetic resin and fastened to the first cover half 18 of the switch cover 17 by a plurality of, e.g., a pair of screw members 28, 28; the switch operating element 26 supported by a pivot 29 mounted in the switch case 25; a resiliently urging means 32 provided between the switch case 25 and the switch operating element 26; and a switch mechanism 44 for changing the switching mode in response to the operation of the switch operating element 26.

The switch case 25 is housed within the switch cover 17. The switch case 25 integrally comprises: first and second sidewalls 25a and 25b extending vertically and facing each other at a distance in a lengthwise direction of the steering handlebar 15 within the switch cover 17; a front wall 25c extending vertically and connected at right angles to the first and second sidewalls 25a and 25b; and a bridge portion 25d connecting rear and lower portions of the first and second sidewalls 25a and 25b to each other at right angles. Mounting portions 33 and 34 provided at upper and lower portions of the first sidewall 25a are fastened to support portions 35 and 36 provided on the first cover half 18 by the screw members 28, 28, respectively.

The pivot 29 protrudes downwards from a lower surface of a central part of the bridge portion 25d of the switch case 25. Further, a mounting boss 37 coaxially connected to the pivot 29 is integrally and projectingly provided on an upper surface of the central part of the bridge portion 25d to extend upwards. A threaded bore 38 opened toward a tip end of the pivot 29 is provided to extend from the pivot 29 via the bridge portion 25d to the mounting boss 37.

The switch operating element 26 is formed of a metal plate material with a portion thereof protruding into the switch case 25 so as to slidably contact with a lower surface of the bridge portion 25d. Further, the switch operating element 26 is provided with along bore 39 through which the pivot 29 is inserted. A washer 40 abuts against the tip end of the pivot 29 so as to sandwich the switch operating element 26 between the washer 40 and the bridge portion 25. A screw member 41 is inserted through the washer 40, and is threadedly engaged into the threaded bore 38.

Thus, the switch operating element 26 is supported by the pivot 29 so that the switch operating element 26 can be returned and pushed-in between a returned position (a position shown in FIGS. 4 to 8) and a pushed-in position (a position shown in FIG. 12) which are spaced apart from each other in a direction perpendicular to an axis of the pivot 29, and so that, in the returned position, the switch operating element 26 can be swung about the pivot 29 among a neutral position, and left-turn and right-turn indicating positions on opposite sides of the neutral position.

The resiliently urging means 32 is adapted to urge the switch operating element 26 to the neutral position and the returned position. The resiliently urging means 32 includes: a return plate 45 supported on the switch case 25; and a pair of return springs 46, 46 provided between the return plate 45 and the switch case 25. The return plate 45 has, at one end, a guide recess 48 against which abuts a first pin 47 provided on the switch operating element 26 to protrude out of one surface of the switch operating element 26 opposite from the bridge portion 25d. The return plate 45 is supported on the switch case 25 so that the return plate 45 can slide in a direction parallel to the push-in/returning direction 49 of the switch operating element 26. The return springs 46 are provided between the return plate 45 and the switch case 25 so as to exhibit spring forces for urging the return plate 45 in a direction to bring the first pin 47 into abutment against the guide recess 48.

The return plate 45 is formed so as to integrally include a main plate portion 45a extending long in the pushing-in/returning direction 49, and a pair of arm portions 45b, 45b protruding to opposite sides from one end of the main plate portion 45a. Further, the guide recess 48 is curved into a substantially triangular shape, including: a valley 50 against which the first pin 47 is brought into abutment in a state in which the switch operating element 26 is in the neutral position; and a pair of return cam faces 51 and 52 provided on opposite sides of the valley 50 and inclined so that the first pin 47 is brought into abutment against the return cam faces 51 and 52 in response to the swinging of the switch operating element 26 to the left-turn and right-turn indicating positions. The return plate 45 is formed into a substantially Y-shape as a whole.

First guide protrusions 53, 53 are projectingly provided on opposite sides of the other end of the main plate portion 45a of the return plate 45, respectively. Guide grooves 54, 54 are provided in the switch case 25 on opposite sides of the return plate 45 so that the first guide protrusions 53 are slidably fitted into the guide grooves 54, 54. Second guide protrusions 55, 55 are projectingly provided at outer ends of the arm portions 45b of the return plate 45, respectively. Guide bores 56, 56 are provided in the first and second sidewalls 25a and 25b of the switch case 25, respectively, so that the second guide protrusions 55, 55 are slidably fitted into the guide bores 56, 56. Thus, the guide grooves 54 and the guide bores 56 are formed to extend long along the pushing-in/returning direction 49, and the return plate 45 is supported on the switch case 25 so as to slide in a direction parallel to the pushing-in/returning direction 49 of the switch operating element 26.

The return springs 46 are coil springs provided on the opposite sides of the valley 50 and between the return plate 45 and the switch case 25, and arranged under compression between the arm portions 45b of the return plate 45 and the switch case 25. Spring accommodating portions 57, 57 of a substantially U-shape in cross section opened on a side opposite from the front wall 25c are provided on the switch case 25 outside the guide grooves 54. Protrusions 58, 58 are provided on the arm portions 45b of the return plate 45 to protrude toward the spring accommodating portions 57. One end of each of the return springs 46 abuts against corresponding one of the arm portions 45b to surround corresponding one of the protrusions 58, and the other ends of the return springs 46 housed in the spring accommodating portions 57 are received on the front wall 25c.

Figure 5:
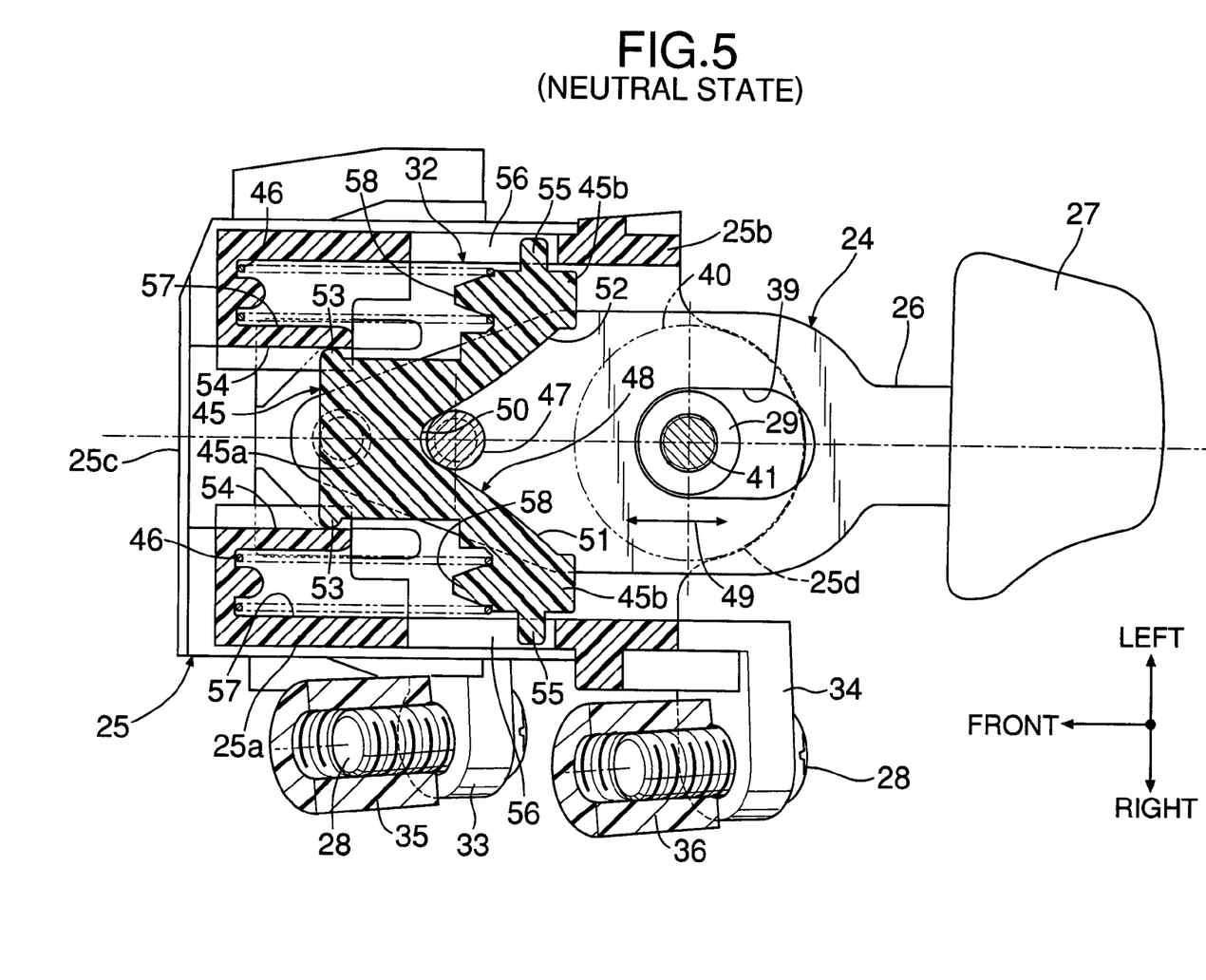
FIG. 5 is an enlarged sectional view taken along a line 5-5 in FIG. 3.
Figure 9:
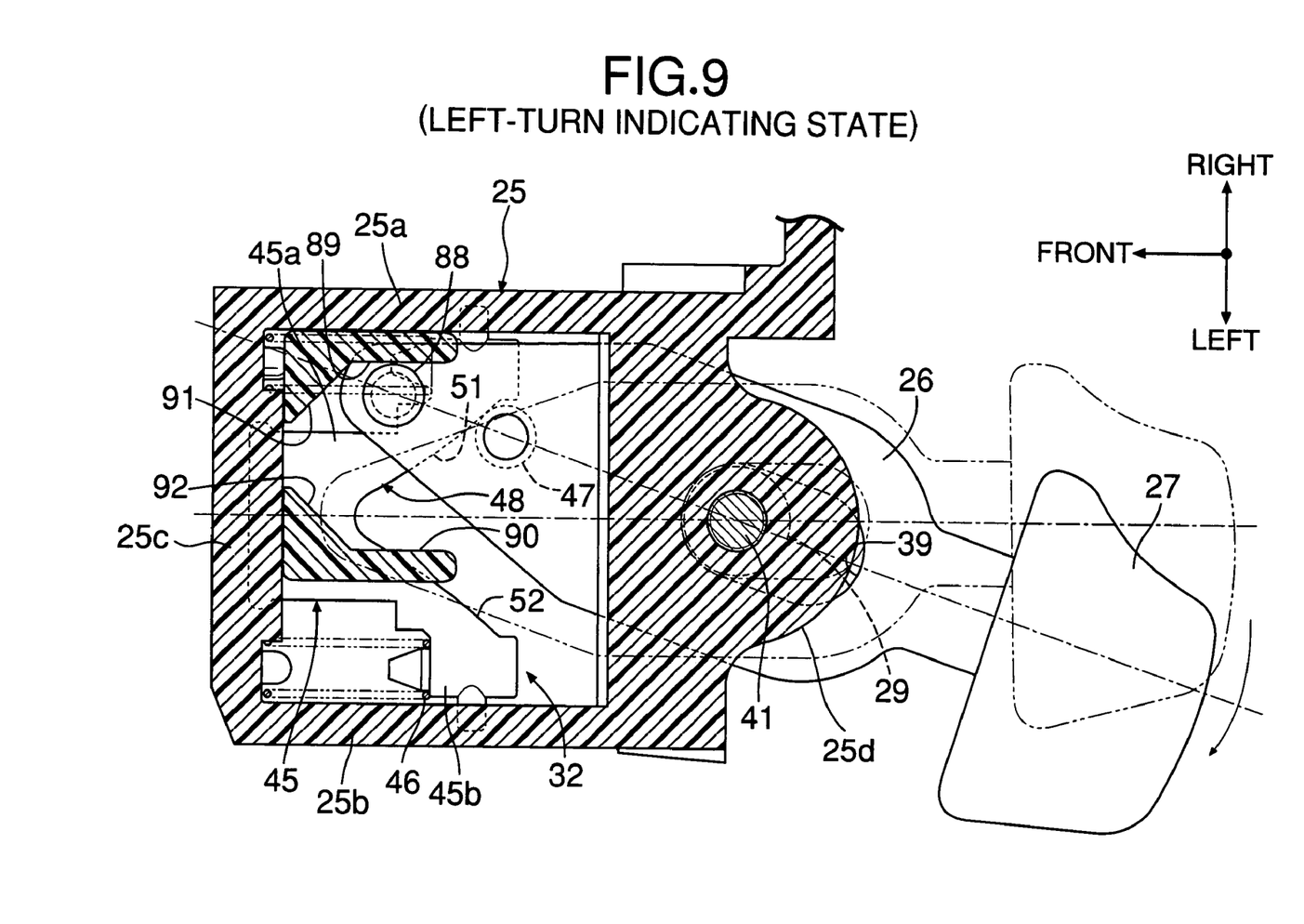
FIG. 9 is a view similar to FIG. 6, but when the switch operating element is operated to a left-turn indicating position.
Figure 11:
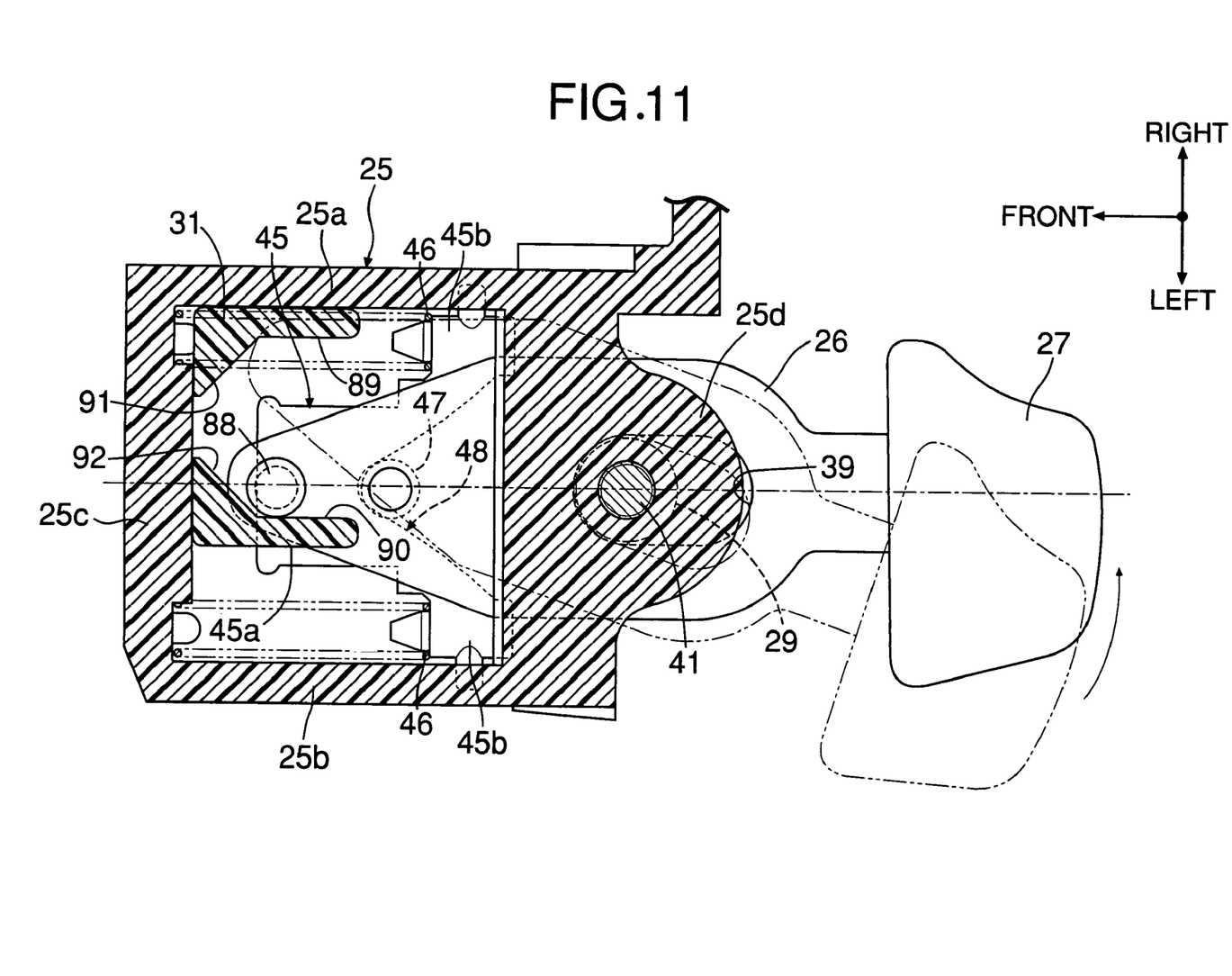
FIG. 11 is a view similar to FIG. 7, but in a state in which the inputting of an operating force to the switch operating element is stopped after the operation of the switch operating element to the right-turn indicating position.

With such resiliently urging means 32, the return springs 46 exhibit the spring forces to urge the first pin 47 into abutment against the valley 50 of the guide recess 48 as shown in FIG. 5, in a state in which the switch operating element 26 is in the neutral position. When the switch operating element 26 is swung to the left-turn indicating position as shown in FIG. 9, the first pin 47 abuts against one 51 of the return cam faces 51 and 52 provided on the opposite sides of the valley 50, however, the spring forces exhibited by the return springs 46 act on the first pin 47 through the return plate 45 so as to return the first pin 47 to the valley 50, i.e., to return the switch operating element 26 to the neutral position because the return cam face 51 is an inclined face; and when the inputting of the operating force to the switch operating element 26 is stopped, the switch operating element 26 is returned to the neutral position, as shown in FIG. 11. On the other hand, when the switch operating element 26 is swung to the right-turn indicating position, the first pin 47 abuts against the other 52 of the return cam faces 51 and 52 provided on the opposite sides of the valley 50, however, the spring forces exhibited by the return springs 46 act on the first pin 47 through the return plate 45 so as to return the first pin to the valley 50 because the return cam face 52 is an inclined face; and when the inputting of the operating force to the switch operating element 26 is stopped, the switch operating element 26 is returned to the neutral position.

Figure 12:
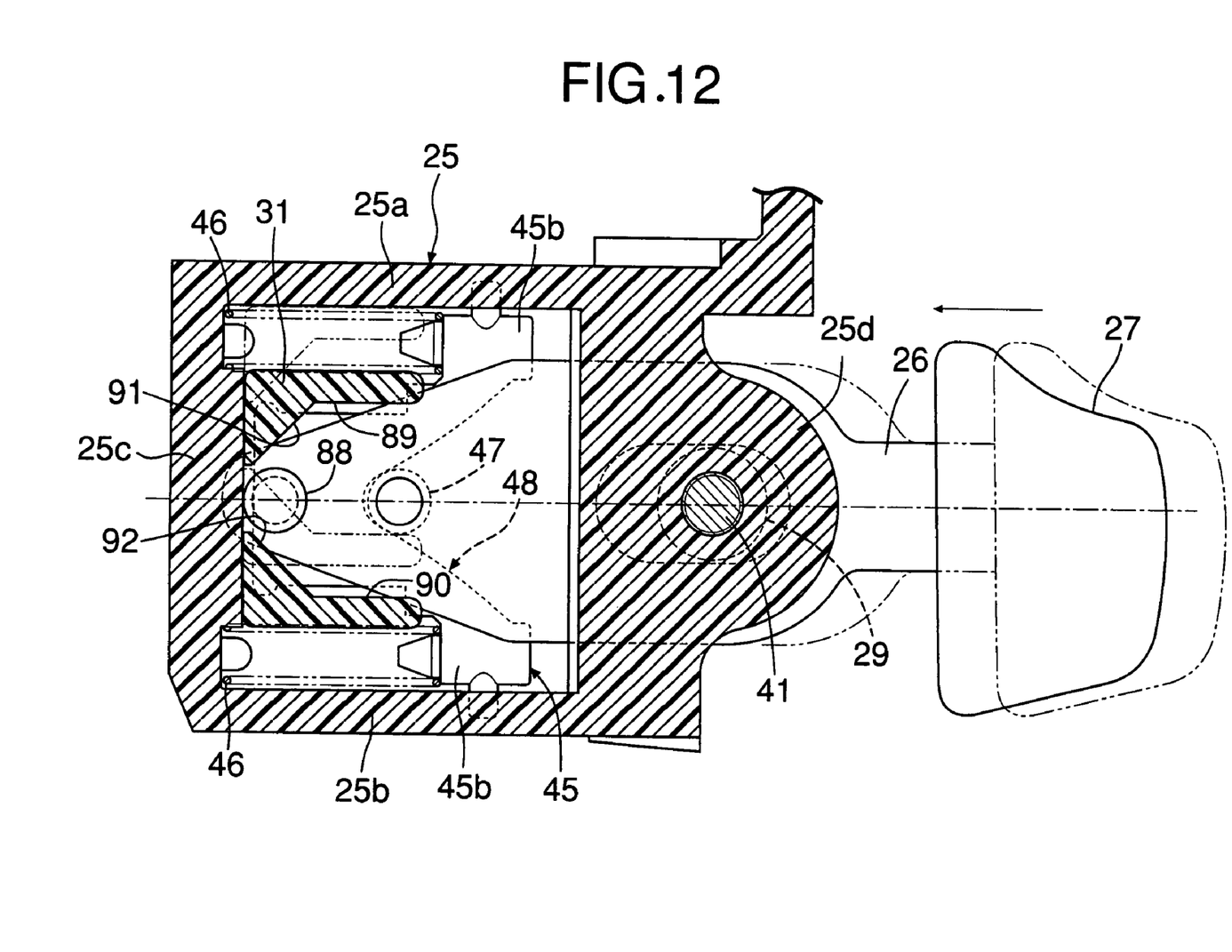
FIG. 12 is a view similar to FIG. 7, but in a state in which the switch operating element is pushed to the pushed-in position.

When the switch operating element 26 is pushed into the pushed-in position, as shown in FIG. 12, the resiliently urging means 32 exerts the spring force for urging the switching operating element 26 toward the returned position through the first pin 47.

The switch mechanism 44 includes: a synthetic resin stationary contact base 30 fixed to the switch case 25 and having a plurality of first to sixth stationary contacts 65 to 70; and a movable contact holder 31 which is opposed to the stationary contact base 30 and has a plurality of first to fifth stationary contacts 73 to 77 and which is adapted to be slid in response to the operation of the switch operating element 26. The switch mechanism 44 is disposed within the switch case 25 in such a manner that the switch operating element 26 is sandwiched between the switch mechanism 44 and the resiliently urging means 32.

Figure 7:
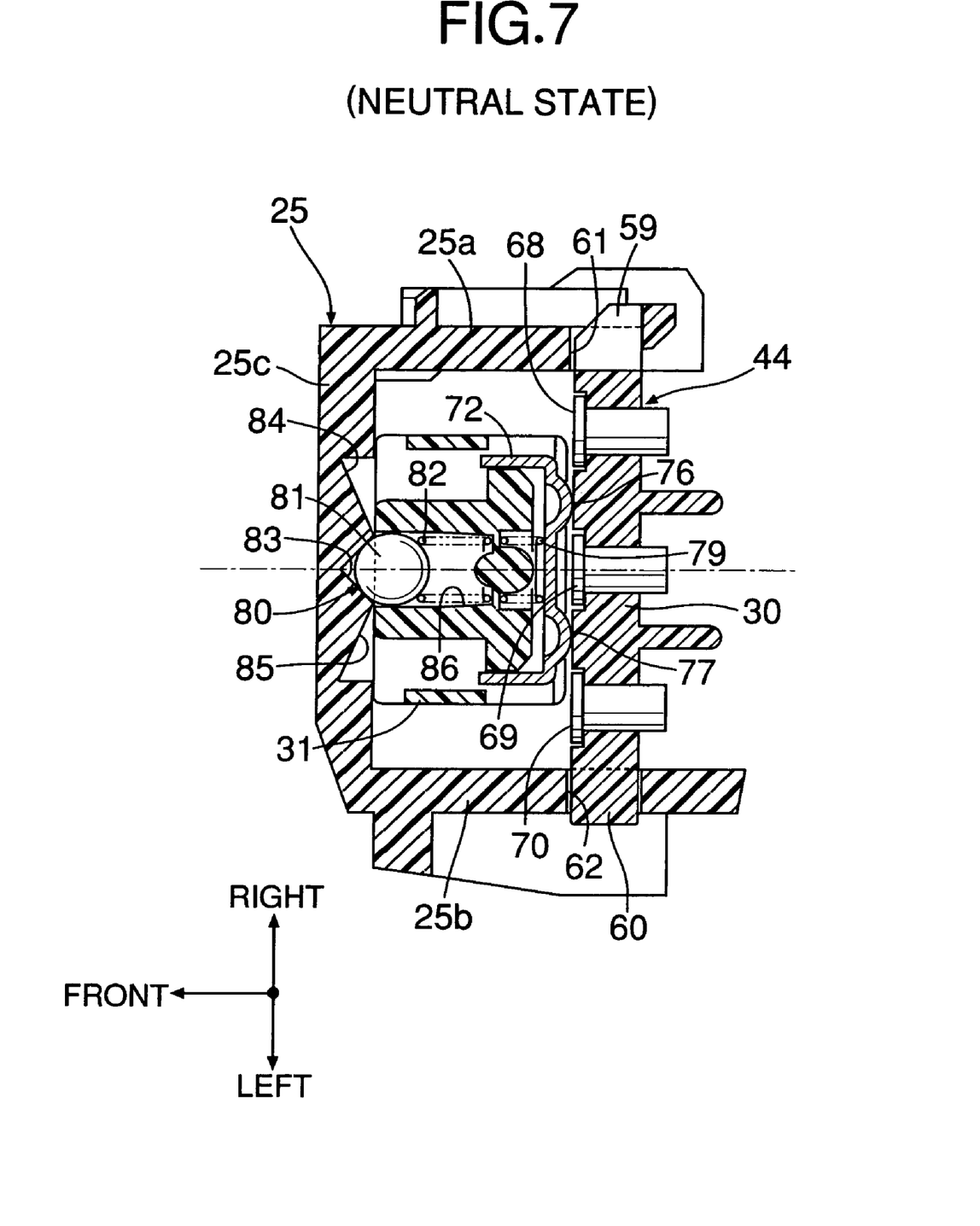
FIG. 7 is an enlarged sectional view taken along a line 7-7 in FIG. 3.
Figure 8:
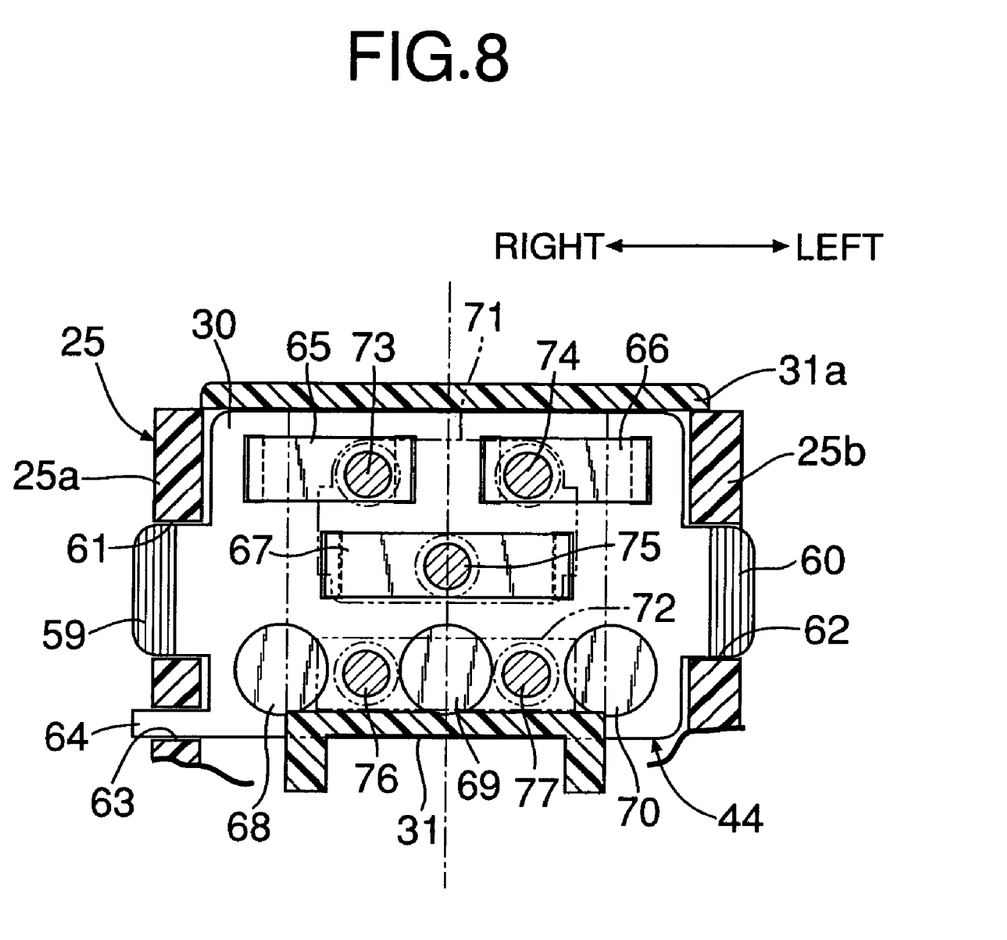
FIG. 8 is an enlarged sectional view taken along a line 8-8 in FIG. 3.

Referring to FIGS. 7 and 8, the stationary contact base 30 is provided at a position spaced apart from the front wall 25c of the switch case 25, and is fixed to the switch case 25 by bringing first and second engagement protrusions 59 and 60 integrally projectingly provided on opposite sides of the stationary contact base 30 into resilient engagement with first and second locking bores 61 and 62 provided in the first and second sidewalls 25a and 25b of the switch case 25, respectively. A slit 63 is provided in the first sidewall 25a at a position adjacent the first locking bore 61 so that the slit 63 extends long along the pushing-in/returning direction 49 and opens into a rear end of the second sidewall 25b. The slit 63 is adapted to enable the first sidewall 25a to be flexed upon the resilient engagement of the first engagement protrusion 59 with the first locking bore 61. Further, a positioning protrusion 64 is projectingly provided on the stationary contact base 30 at a position adjacent the first engagement protrusion 59 so that the positioning protrusion 64 is fitted into the slit 63. By this fitting of the positioning protrusion 64 into the slit 63, it is possible to prevent erroneous assembling of the stationary contact base 30 to the switch case 25.

On the side of the front surface of the stationary contact base 30, i.e., on the side of the front wall 25c of the switch case 25, there are provided first and second stationary contacts 65 and 66 extending long and arranged in the left/right direction; a third stationary contact 67 extending long in the left/right direction below the first and second stationary contacts 65 and 66; and fourth, fifth and sixth contacts 68, 69 and 70 arranged in the left/right direction below the third stationary contact 67.

On the other hand, the movable contact holder 31 is disposed between the front wall 25c of the switch case 25 and the stationary contact base 30. Disposed on a surface of the movable contact holder 31 opposed to the stationary contact base 30 are a first contact plate 71 corresponding to the first to third stationary contacts 65 to 67, and a second contact plate 72 corresponding to the fourth to sixth stationary contact 68 to 70. Further, the first contact plate 71 has first and second movable contacts 73, 74 projectingly provided thereon and capable of being brought into conduction contact with the first and second stationary contacts 65 and 66, respectively, and a third movable contact 75 projectingly provided thereon to be always in conduction contact with the third stationary contact 67. The second contact plate 72 has a fourth movable contact 76 projectingly provided thereon and capable of being brought into contact with the fourth and fifth stationary contacts 68 and 69, and a fifth movable contract 77 projectingly provided thereon and capable of being brought into contact with the fifth and sixth stationary contacts 69 and 70.

Furthermore, springs 78 and 79 are mounted between the movable contact holder 31 and the first and second contact plates 71 and 72 so as to urge the first and second contact plates 71 and 72 toward the stationary contact base 30, respectively. The first and second contact plates 71 and 72 are floatingly supported on the movable contact holder 31.

The movable contact holder 31 is supported between the stationary contact base 30 and the front wall 25c of the switch case 25 in such a manner that the conduction contact states of the movable contacts 73 to 77 with the plurality of stationary contacts 65 to 70 are changed in response to the swinging of the switch operating element 26. The movable contact holder 31 is capable of being slid between the first and second sidewalls 25a and 25b of the switch case 25.

Figure 6:
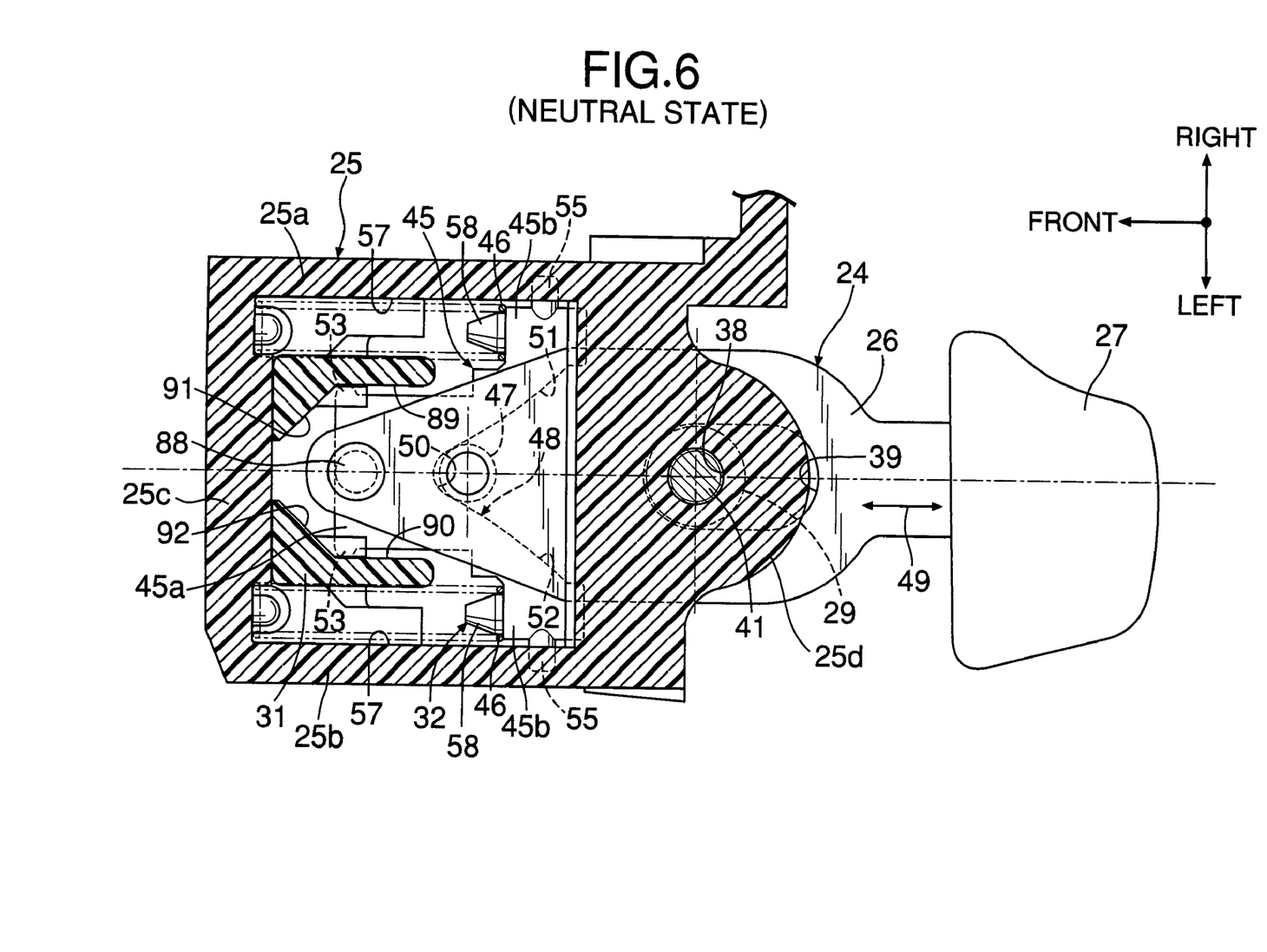
FIG. 6 is an enlarged sectional view taken along a line 6-6 in FIG. 3.
Figure 10:
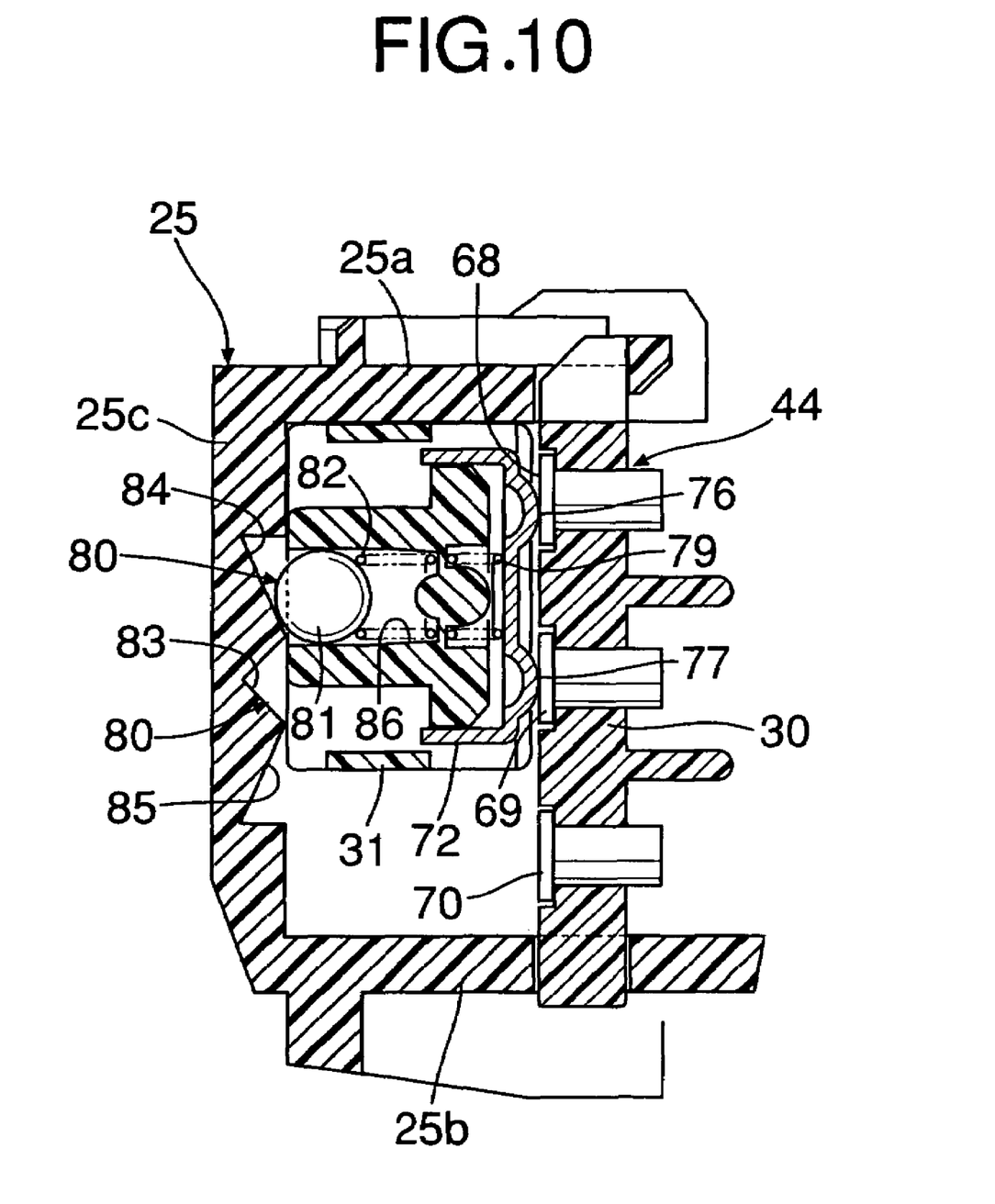
FIG. 10 is a view similar to FIG. 7, but when the switch operating element is operated to the right-turn indicating position.

Referring to FIG. 6, a second pin 88 is provided at an end of the switch operating element 26 protruding into the switch case 25. The second pin 88 is provided on the switch operating element 26 to protrude out of the other surface of the switch operating element 26 on the side of the movable contact holder 31 at a position more spaced apart from the pivot 29 as compared with the first pin 47. First and second abutment faces 89 and 90 are provided on the movable contact holder 31 so as to extend in parallel to each other along the pushing-in/returning direction 49 of the switch operating element 26, and are adapted to be located on opposite sides of the second pin 88 when the switch operating element 26 is in the returned position. In a state in which the switch operating element 26 is in the returned position and the neutral position when neither the left-turn indication nor the right-turn indication is provided, the first and second abutment faces 89 and 90 are equidistant from the second pin 88. When the switch operating element 26 is swung from this state to the left-turn indicating position, the second pin 88 abuts against the first abutment face 89, thereby sliding the movable contact holder 31 to the left-turn indicating position in which it is in abutment against the first sidewall 25*a* of the switch case 25, as shown in FIGS. 9 and 10. When the switch operating element 26 in this state is returned to the neutral position as shown in FIG. 11, the second pin 88 abuts against or nears the second abutment face 90 so as not to exert an urging force to the movable contact holder 31.

When the switch operating element 26 is swung to the right-turn indicating position from the state in which it is in the returned position and the neutral position when neither the left-turn indication nor the right-turn indication is provided, the second pin 88 abuts against the second abutment face 90, thereby sliding the movable contact holder 31 to the right-turn indicating position in which it is in abutment against the second sidewall 25*b* of the switch case 25. When the switch operating element 26 in this state is returned to the neutral position, the second pin 88 abuts against or nears the first abutment face 89 so as not to exert an urging force to the movable contact holder 31.

Further, the movable contact holder 31 has a first cam face 91 connected to the first abutment face 89 and a second cam face 92 connected to the second abutment face 90 so that the cam faces 91 and 92 abut against the second pin 88 in a state in which the switch operating element 26 is in the pushed-in position. The first and second cam faces 91 and 92 are formed to be inclined so that they becomes close to each other toward the front wall 25*c* of the switch case 25.

Thus, when the switch operating element 26 is pushed to the pushed-in position in a state in which the movable contact holder 31 is in the left-turn indicating position, the second pin 88 abuts against the second cam face 92 and moves to the pushed-in position in sliding contact with the second cam face 92, whereby the movable contact holder 31 is returned to the neutral position, as shown in FIG. 12. Also, when the switch operating element 26 is pushed to the pushed-in position in a state in which the movable contact holder 31 is in the right-turn indicating position, the second pin 88 abuts against the first cam face 91 and moves to the pushed-in position in sliding contact with the first cam face 91, whereby the movable contact holder 31 is returned to the neutral position.

As clearly shown in FIG. 7, a click mechanism 80 is provided between the front wall 25*c* and the movable contact holder 31 so as to maintain the position of the movable contact holder 31 which varies corresponding to the swinging of the switch operating element 26.

The click mechanism 80 comprises: a steel ball 81 most part of which is accommodated in a bottomed accommodating bore 86 provided in the movable contact holder 31 and open toward the front wall 25*c* of the switch case 25; a click spring 82 provided between a closed end of the accommodating bore 86 and the steel ball 81 to exhibit a spring force for urging the steel ball 81 toward the front wall 25*c*; a neutral position-maintaining recess 83 provided in the front wall 25*c* of the switch case 25 so that a portion of the steel ball 81 is brought into engagement with the neutral position-maintaining recess 83 when the movable contact holder 31 is in the neutral position corresponding to the switch operating element 26 in the neutral position; a left-turn indicating position maintaining recess 84 provided in the front wall 25*c* so that a portion of the steel ball 81 is brought into engagement with the left-turn indicating position maintaining recess 84 when the movable contact holder 31 is moved to the left-turn indicating position in response to the swinging of the switch operating element 26 to the left-turn indicating position; and a right-turn indicating position maintaining recess 85 provided in the front wall 25*c* so that a portion of the steel ball 81 is brought into engagement with the right-turn indicating position-maintaining recess 85 when the movable contact holder 31 is moved to the right-turn indicating position in response to the swinging of the switch operating element 26 to the right-turn indicating position.

Thus, when the movable contact holder 31 is in the neutral position, the first and second movable contacts 73 and 74 are in conduction contact with the first and second stationary contacts 65 and 66; the third movable contact 75 is in conduction contact with the third stationary contact 67; and neither the fourth nor fifth movable contact 76 nor 77 are in conduction contact with any of the fourth to sixth stationary contacts 68 to 70, as shown in FIG. 8. In this state, both a left-turn indicating circuit and aright-turn indicating circuit (both not shown) are in open states.

When the movable contact holder 31 is moved to the left-turn indicating position, the first and third movable contacts 73 and 75 are in conduction contact with the first and third stationary contacts 66 and 67, while the second movable contact 74 is moved to a position out of the conduction contact with the second stationary contact 66, and the fourth and fifth movable contacts 76 and 77 are individually in conduction contact with the fourth and fifth stationary contacts 68 and 69. In this state, the left-turn indicating circuit is in a closed state.

When the movable contact holder 31 is moved to the right-turn indicating position, the second and third movable contacts 74 and 75 are in conduction contact with the second and third stationary contacts 65 and 67, while the first movable contact 73 is moved to a position out of the conduction contact with the first stationary contact 65, and the fourth and fifth movable contacts 76 and 77 are individually in conduction contact with the fifth and sixth stationary contacts 69 and 70. In this state, the right-turn indicating circuit is in a closed state.

Further, the movable contact holder 31 is integrally provided with a cover portion 31*a* which is adapted to cover from above a region between opposed surfaces of the movable contact holder 31 and the stationary contact base 30 when at least both the left-turn and right-turn indicating circuits are in the open states. In this embodiment, the cover portion 31*a* is formed to cover from above the region between the opposed surfaces of the movable contact holder 31 and the stationary contact base 30, as clearly shown in FIG. 8, when both the left-turn and right-turn indicating circuits are in the open states, i.e., when the movable contact holder 31 is in the neutral position. In this state, a peripheral edge of the cover portion 31*a* is slidably in contact with upper ends of the first sidewall 25*a*, the second sidewall 25*b* and the front wall 25*c* of the switch case 25.

The operation of this embodiment will be described below. The resiliently urging means 32 is provided between the switch case 25 and the switch operating element 26 so as to urge the switch operating element 26 toward the neutral position and the returned position. The resiliently urging means 32 includes: the return plate 45 which is supported on the switch case 25 so that it can slide in the direction parallel to the pushing-in/returning direction 49 of the switch operating element 26 and which has at one end a guide recess 48 against which abuts the first pin 47 provided on the switch operating element 26; and the pair of return springs 46, 46 provided between the return plate 45 and the switch case 25 to exhibit the spring forces for urging the return plate 45 in the direction to bring the first pin 47 into engagement against the guide recess 48. The guide recess 48 is curved into a substantially triangular shape, including: a valley 50 against which the first pin 47 is brought into abutment in a state in which the switch operating element 26 is in the neutral position; and a pair of return cam faces 51 and 52 provided on the valley 50 and inclined so that the first pin 47 is brought into abutment against the return cam faces 51 and 52 in response to the swinging of the switch operating element 26 to the left-turn and right-turn indicating positions. The return springs 46 are provided on the opposite sides of the valley 50 and between the return plate 45 and the switch case 25.

With such resiliently urging means 32, the pair of the return springs 46 exhibit the spring forces for urging the first pin 47 of the switch operating element 26, as follows: when the switch operating element 26 is in the neutral position, the first pin 47 is urged to abut against the valley 50; when the switch operating element 26 is swung to the left-turn or right-turn indicating position, the first pin 47 abutting against one of the return cam faces 51 and 52 on the opposite sides of the valley 50 is urged to return to the valley 50, i.e., the switch operating element 26 is urged to return to the neutral position; and when the switch operating element 26 is pushed to the pushed-in position, the first pin 47 is urged to return to the returned position.

The return plate 45 and the pair of return springs 46 are disposed in line with the switch operating element 26, thereby reducing the entire length of the turn signal switch 24 in the pushing-in/returning direction 49 of the switch operating element 26. Further, the pair of return springs 46 exhibit the spring forces from the opposite sides to return the switch operating element 26 to the neutral position, thereby suppressing the wobbling of the switch operating element 26 during operation thereof to improve the operational feeling.

Further, the resiliently urging means 32 and the switch mechanism 44 are disposed within the switch case 25 with the switch operating element 26 interposed therebetween, thereby reducing the entire length of the turn signal switch 24 in the pushing-in/returning direction 49 of the switch operating element 26. Furthermore, the position of the switch operating element 26 can be changed depending on which side of the switch operating element 26 the resiliently urging means 32 and the switch mechanism 44 are disposed on, thereby increasing the degree of freedom in vertical arrangement of the operating knob 27 which is an operating portion of the switch operating element 26.

The movable contact holder 31 is integrally provided with the cover portion 31a which is adapted to cover from above the region between the opposed surfaces of the movable contact holder 31 and the stationary contact base 30 when at least both the left-turn and right-turn indicating circuits are in the open states, i.e., when at least the movable contact holder 31 is in the neutral position. That is, the region between the opposed surfaces of the movable contact holder 31 and the stationary contact base 30 is covered from above in a state in which at least neither the left-turn nor right-turn indicating operation is carried out, thereby preventing rainwater or the like from entering from above the region between the opposed surfaces of the movable contact holder 31 and the stationary contact base 30.

Further, the switch operating element 26 is provided with the first pin 47 protruding out of one surface of the switch operating element 26, and the second pin 88 protruding out of the other surface of the switch operating element 26 at the position more spaced apart from pivot 29 as compared with the first pin 47. The resiliently urging means is disposed on one side of the switch operating element 26 so as to provide the resilient force for urging the first pin 47 toward the neutral position and the returned position. The movable contact holder 31 having the first to fifth movable contacts 73 to 77 and constituting a portion of the switch mechanism 44 is operatively connected to the second pin 88 so as to slide among the neutral position, and the left-turn and right-turn indicating positions on the opposite sides of the neutral position in response to the swinging of the switch operating element 26. With this arrangement, it is possible to relatively increase the distance between the second pin 88 operatively connected to the movable contact holder 31 and the pivot 29 to relatively increase the amount of sliding of the movable contact holder 31 with the swinging of the switch operating element 26, thereby securing a sufficient insulation distance between the contacts of the switch mechanism 44. Further, a space required for movement of the resiliently urging means 32 in the pushing-in/returning direction 49 is reduced by the arrangement wherein the resiliently urging force of the resiliently urging means 32 is applied to the first pin 47 having a relatively large distance from the pivot 29, thereby downsizing the turn signal switch 24 and increasing the degree of freedom in setting an operating load.

Although the embodiment of the present invention has been described in detail, the present invention is not limited to the above-described embodiment, and various modifications in design may be made without departing from the subject matter of the invention.

For example, in the above-described embodiment, the movable contact holder 31 of the switch mechanism 44 is formed separately from the switch operating element 26, but the switch mechanism can be constructed to have a movable contact holder integral with a switch operating element.

What is claimed is:

1. A turn signal switch for a vehicle, comprising:
   a switch case;
   a pivot provided in the switch case;
   a switch operating element whose portion protrudes into the switch case, and which is supported by the pivot so that the switch operating element can be pushed-in and returned between a pushed-in position and a returned position which are spaced apart from each other in a direction perpendicular to an axis of the pivot, and so that, in the returned position, the switch operating element can be swung about the axis of the pivot among a neutral position, and a left-turn indicating position and a right-turn indicating position on opposite sides of the neutral position;
   a resiliently urging means provided between the switch case and the switch operating element so as to urge the switch operating element toward the neutral position and the returned position; and
   a switch mechanism operatively connected to the switch operating element, and adapted to close a left-turn indicating circuit or a right-turn indicating circuit in response to swinging of the switch operating element to the left-turn or right-turn indicating position when the switch operating element is in the returned position, and adapted to open the left-turn or right-turn indicating circuit in response to movement of the switch operating element from the returned position to the pushed-in position, wherein the resiliently urging means includes:
- a return plate having a guide recess which is provided at one end and against which abuts a first pin provided on the switch operating element, the return plate being supported on the switch case so that the return plate can slide in a direction parallel to directions to push-in and return the switch operating element; and
- a pair of return springs provided between the return plate and the switch case to exhibit spring forces for urging the return plate in a direction to bring the pin into abutment against the guide recess, wherein the guide recess is curved into a substantially triangular shape, and includes:
- a valley against which the pin is brought into abutment in a state in which the switch operating element is in the neutral position; and
- return cam faces provided on opposite sides of the valley, and inclined so that the pin is brought into abutment against the return cam faces in response to the swinging of the switch operating element to the left-turn and right-turn indicating positions, and wherein the return springs are provided on the opposite sides of the valley and between the return plate and the switch case.

2. A turn signal switch for a vehicle according to claim 1, wherein the switch mechanism includes a stationary contact base having a plurality of stationary contacts and fixedly disposed within the switch case, and a movable contact holder having a plurality of movable contacts and disposed to face the stationary contact base so that states of conduction contact of the movable contacts with the plurality of stationary contacts are changed in response to the swinging of the switch operating element; and the movable contact holder is integrally provided with a cover portion so as to cover from above a region between opposed surfaces of the movable contact holder and the stationary contact base when at least both the left-turn and right-turn indicating circuits are opened.

3. A turn signal switch for a vehicle, comprising:
   a switch case;
   a pivot provided in the switch case;
   a switch operating element whose portion protrudes into the switch case, and which is supported by the pivot so that the switch operating element can be pushed-in and returned between a pushed-in position and a returned position which are spaced apart from each other in a direction perpendicular to an axis of the pivot, and so that, in the returned position, the switch operating element can be swung about the axis of the pivot among a neutral position, and a left-turn indicating position and a right-turn indicating position on opposite sides of the neutral position;
   a resiliently urging means provided between the switch case and the switch operating element so as to urge the switch operating element toward the neutral position and the returned position; and
   a switch mechanism operatively connected to the switch operating element, and adapted to close a left-turn indicating circuit or a right-turn indicating circuit in response to swinging of the switch operating element to the left-turn or right-turn indicating position when the switch operating element is in the returned position, and adapted to open the left-turn or right-turn indicating circuit in response to movement of the switch operating element from the returned position to the pushed-in position,
   wherein the resiliently urging means and the switch mechanism are disposed within the switch case with the switching operating element interposed therebetween.

4. A turn signal switch for a vehicle according to claim 3, wherein the switch operating element includes a first pin protruding out of one surface of the switch operating element, and a second pin protruding out of the other surface of the switch operating element at a position more spaced apart from the pivot as compared with the first pin; the resiliently urging means is disposed on one side of the switch operating element so as to apply to the first pin a resiliently urging force for urging the first pin toward the neutral position and the returned position; and a movable contact holder constituting a portion of the switch mechanism and having a plurality of movable contacts is operatively connected to the second pin so that the movable contact holder slides among the neutral position and the left-turn and right-turn indicating positions on the opposite sides of the neutral position, in response to the swinging of the switch operating element.

* * * * *